United States Patent
Bell et al.

(10) Patent No.: US 10,518,632 B2
(45) Date of Patent: Dec. 31, 2019

(54) VALVE ASSEMBLY

(71) Applicant: Tenneco Automotive Operating Company Inc., Lake Forest, IL (US)

(72) Inventors: Charles Louis Bell, Jackson, MI (US); Danny D. Alexander, Horton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/045,235

(22) Filed: Jul. 25, 2018

(65) Prior Publication Data

US 2018/0326837 A1 Nov. 15, 2018

(51) Int. Cl.
| | |
|---|---|
| *B60K 13/06* | (2006.01) |
| *F02D 9/04* | (2006.01) |
| *F01N 1/16* | (2006.01) |
| *F01N 1/00* | (2006.01) |
| *F01N 1/04* | (2006.01) |
| *F01N 1/08* | (2006.01) |
| *F01N 1/10* | (2006.01) |
| *B60K 13/04* | (2006.01) |

(52) U.S. Cl.
CPC .............. *B60K 13/06* (2013.01); *B60K 13/04* (2013.01); *F01N 1/00* (2013.01); *F01N 1/006* (2013.01); *F01N 1/04* (2013.01); *F01N 1/089* (2013.01); *F01N 1/10* (2013.01); *F01N 1/166* (2013.01); *F02D 9/04* (2013.01); *F01N 2240/36* (2013.01); *F01N 2260/06* (2013.01); *Y10T 137/7903* (2015.04)

(58) Field of Classification Search
CPC .................................................... F16K 47/023

USPC .......................................................... 137/527.8
See application file for complete search history.

(56) References Cited

U.S. PATENT DOCUMENTS

| | | | | |
|---|---|---|---|---|
| 429,156 A | * | 6/1890 | Shepherd ................ | F16K 15/03 137/527.8 |
| 987,946 A | * | 3/1911 | Bergler .................... | F16K 47/10 137/513.3 |
| 1,613,322 A | * | 1/1927 | Goetz ....................... | F01N 1/084 181/254 |
| 2,960,178 A | * | 11/1960 | De Lorean ............. | B60K 13/04 181/238 |
| 3,275,028 A | * | 9/1966 | Reppert ................... | F16K 15/03 137/527.6 |
| 5,355,673 A | * | 10/1994 | Sterling ................. | F01N 13/082 137/527 |

(Continued)

*Primary Examiner* — Umashankar Venkatesan
(74) *Attorney, Agent, or Firm* — McGarry Bair PC

(57) ABSTRACT

A valve assembly for an exhaust system includes a conduit, a valve flap disposed within an exhaust passageway for controlling exhaust flow through the exhaust passageway, a shaft supporting the valve flap in the exhaust passageway for rotation about a pivot axis, and a mass damper disposed external to the conduit and coupled to the shaft. The mass damper includes a longitudinal segment coupled to the shaft. The mass damper also includes a first damping mass that is disposed proximal to a first end of the longitudinal segment and is linearly movable along a centerline axis to a first distance with respect to the pivot axis. The mass damper further includes a second damping mass that is disposed proximal to a second end of the longitudinal segment and is linearly movable along the centerline axis to a second distance with respect to the pivot axis.

7 Claims, 8 Drawing Sheets

(56) References Cited

U.S. PATENT DOCUMENTS

| | | | |
|---|---|---|---|
| 7,510,043 B2* | 3/2009 | Cerri, III | B60K 13/04 |
| | | | 180/296 |
| 7,896,130 B2* | 3/2011 | Hill | F01N 1/166 |
| | | | 123/568.18 |
| 9,540,995 B2* | 1/2017 | Houtschilt | F01N 1/163 |
| 2005/0067219 A1* | 3/2005 | Albertson | F01N 1/02 |
| | | | 181/240 |
| 2006/0054381 A1* | 3/2006 | Takemoto | F01N 1/003 |
| | | | 181/237 |
| 2006/0272322 A1* | 12/2006 | Abram | F01N 1/165 |
| | | | 60/324 |
| 2008/0224083 A1* | 9/2008 | Hill | F01N 1/006 |
| | | | 251/337 |
| 2009/0143919 A1* | 6/2009 | Balemi | F16F 15/02 |
| | | | 700/280 |
| 2016/0222863 A1* | 8/2016 | Middleton, Jr. | F16K 15/033 |

\* cited by examiner

VALVE ASSEMBLY

FIELD

The subject disclosure relates to valve assemblies used in an exhaust system of a vehicle.

BACKGROUND

This section provides background information related to the present disclosure which is not necessarily prior art.

Many vehicle exhaust systems use active valve assemblies and/or passive valve assemblies to alter the characteristics of exhaust flow through a conduit as the exhaust pressure increases due to increasing engine speed. Such valve assemblies can be used to reduce low frequency noise by directing the exhaust flow through mufflers or other exhaust system components. For example, valve assemblies can direct the exhaust flow past obstructions, which create vortices that absorb low frequency sound energy. Active valve assemblies carry the increased expense of requiring a specific actuating element, such as a solenoid. By contrast, passive valve assemblies generally include a spring biased valve flap and utilize the pressure of the exhaust flow in the conduit to actuate (i.e., open) the valve assembly.

Although passive valve assemblies are less expensive, traditional passive valve assemblies create unwanted back pressure when the valve assembly is open, can be difficult to manufacture, and are susceptible to vibration related noise and excessive valve flutter caused by flowrate fluctuations in the engine's exhaust flow (i.e., exhaust pulsation). Such valve assemblies can present vibration and noise problems due to resonance of the valve flap and biasing spring. As a result, there remains a need for passive valve assemblies that are quieter and less expensive to manufacture than existing passive valve assemblies.

SUMMARY

This section provides a general summary of the disclosure and is not a comprehensive disclosure of its full scope or all of its features.

In accordance with the subject disclosure, a valve assembly for an exhaust system is provided. The valve assembly includes a valve flap disposed within an exhaust passageway for controlling exhaust flow through the exhaust passageway. The valve assembly also includes a shaft supporting the valve flap in the exhaust passageway for rotation about a pivot axis. The valve assembly further includes a mass damper disposed external to the conduit and coupled to the shaft such that the mass damper rotates with the shaft about the pivot axis. The mass damper includes a longitudinal segment coupled to the shaft. The longitudinal segment extends between a first end and a second end along a centerline axis. The mass damper also includes a first damping mass disposed proximal to the first end of the longitudinal segment. The first damping mass is linearly movable along the centerline axis to a first distance with respect to the pivot axis. Further, the first damping mass is fixedly coupled to the longitudinal segment at the first distance. The mass damper further includes a second damping mass disposed proximal to the second end of the longitudinal segment. The second damping mass is linearly movable along the centerline axis to a second distance with respect to the pivot axis. Further, the second damping mass is fixedly coupled to the longitudinal segment at the second distance.

BRIEF DESCRIPTION OF THE DRAWINGS

Other advantages of the present disclosure will be readily appreciated, as the same becomes better understood by reference to the following detailed description when considered in connection with the accompanying drawings wherein.

Corresponding reference numerals indicate corresponding parts throughout the several views of the drawings.

DETAILED DESCRIPTION

Figure 1:
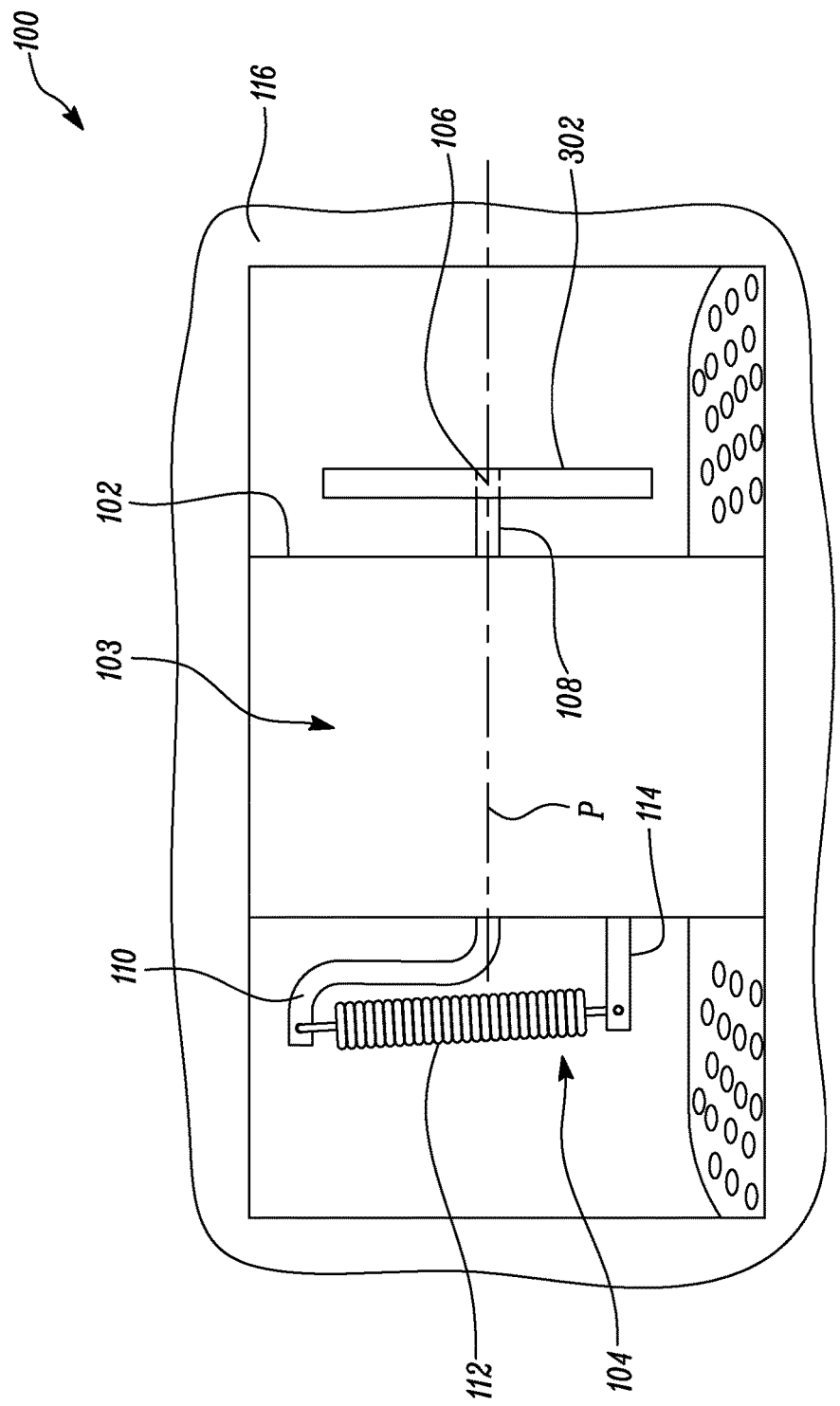
FIG. 1 is a top plan view of a muffler in which a valve assembly is mounted and equipped with a mass damper.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on", "engaged to", "connected to", "attached to" or "coupled to" another element or layer, it may be directly on, engaged, connected, attached or coupled to the other element or layer, or intervening elements or layers may be present. In contrast, when an element is referred to as being "directly on," "directly engaged to", "directly connected to", "directly attached to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "abuts" means that one structure is disposed in contact with or arranged in close proximity to another structure. As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 2:
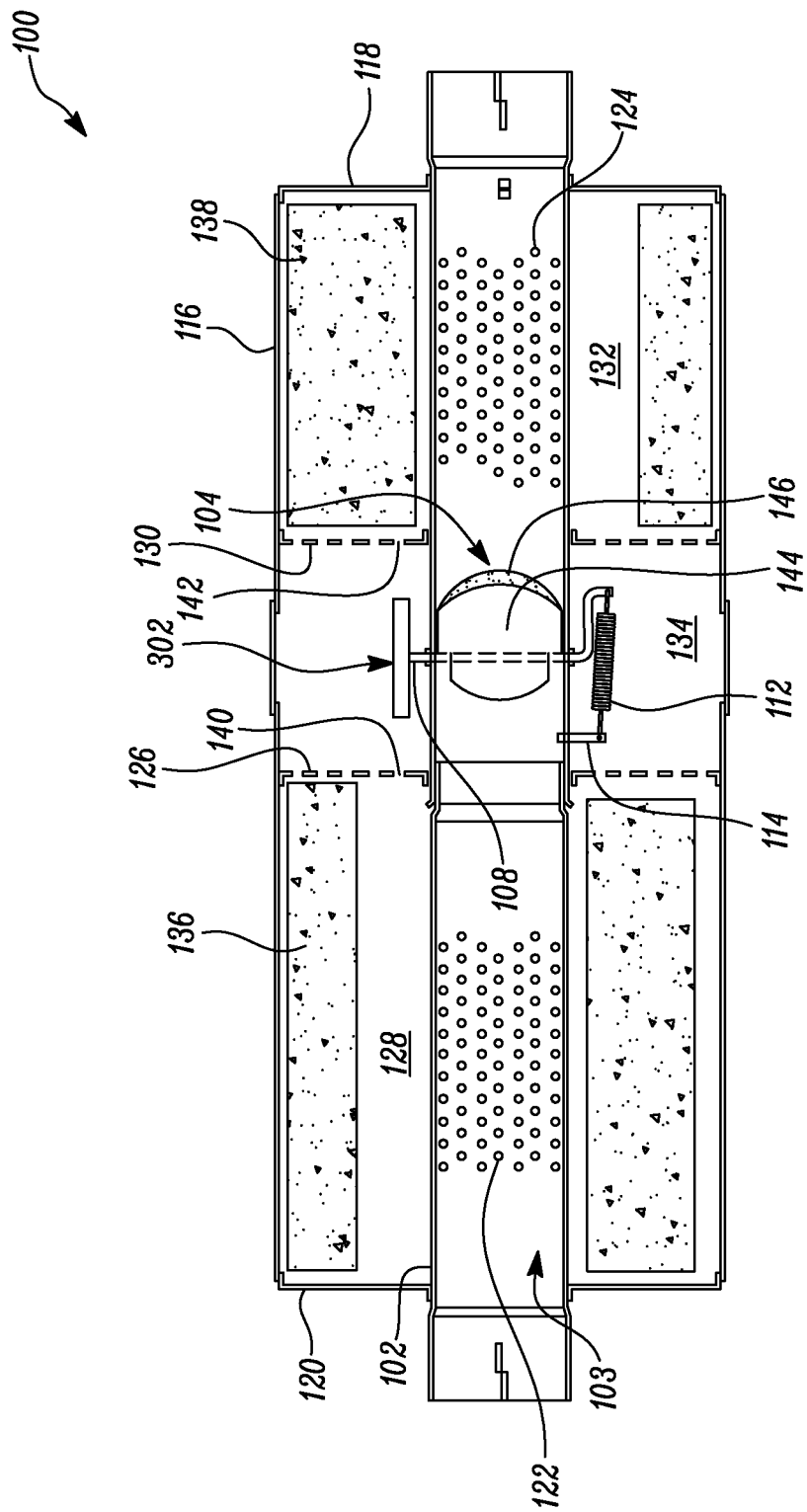
FIG. 2 is a top cross-sectional view of a muffler housing and the valve assembly equipped with the mass damper in accordance with the teachings of the subject disclosure.

With reference to FIGS. 1 and 2, an exhaust system in the form of a muffler 100 is illustrated. The muffler 100 includes a conduit 102 and a valve assembly 104. In one example, the valve assembly 104 is a snap action valve assembly. Further, the conduit 102 extends inside the muffler 100 to define an exhaust passageway 103. The valve assembly 104 is equipped with a mass damper 302, external to the conduit 102, that is mounted at a first end 106 of a shaft 108. The shaft 108 extends through the conduit 102 between the first end 106 and a second end 110. A biasing member 112, also external to the conduit 102, extends between the second end 110 of the shaft 108 and a mounting post 114 that is coupled to the conduit 102. The mass damper 302 is coupled to the shaft 108 such that the mass damper 302 rotates with the shaft 108 about a pivot axis "P" (shown in FIG. 1). Although other configurations are possible, the biasing member 112 in the illustrated example is a coil spring.

As shown in FIG. 2, the muffler 100 includes a housing 116 that is closed at either end by an output header 118 and an input header 120. The conduit 102 is positioned within the muffler 100 and extends completely through the housing 116 of the muffler 100. The conduit 102 includes a first plurality of perforations 122 and a second plurality of perforations 124. Inside the housing 116, a first internal partition 126 defines a first chamber 128 in conjunction with the input header 120 and the housing 116. A second internal partition 130 defines a second chamber 132 in conjunction with the output header 118 and the housing 116. A middle chamber 134 is defined between the first and second internal partitions 126, 130 inside the housing 116.

The first plurality of perforations 122 allow communication between exhaust flowing through the conduit 102 and the first chamber 128, which is filled with sound absorbing material 136 such as fiberglass roving. Similarly, the second plurality of perforations 124 in the conduit 102 provide fluid communication between the exhaust in the conduit 102 and the second chamber 132, which is filled with sound absorbing material 138 such as fiberglass roving. The middle chamber 134 is free from any sound absorbing material. Openings 140 in the first internal partition 126 permit fluid communication of the exhaust between the first chamber 128 and the middle chamber 134, while openings 142 in the second internal partition 130 permit fluid communication of the exhaust between the middle chamber 134 and the second chamber 132.

The valve assembly 104 is mounted in the middle chamber 134 and is therefore located between the first and second internal partitions 126, 130. The valve assembly 104 includes a valve flap 144 that is disposed within the exhaust passageway 103 of the conduit 102 for controlling exhaust flow through the exhaust passageway 103. The shaft 108 supports the valve flap 144 in the exhaust passageway 103 of the conduit 102. The valve flap 144 is rotatable inside the exhaust passageway 103 of the conduit 102 about a pivot axis "P" (shown in FIG. 1) between a closed position and an open position. The biasing member 112 biases the valve flap 144 towards the closed position. The valve flap 144 includes a vibration absorbing damper pad 146 about a portion of its periphery, which would normally be in contact with an interior surface of the conduit 102 in the closed position of the valve flap 144. When the pressure of the exhaust flowing through the conduit 102 reaches a threshold value, the biasing force that the biasing member 112 applies on the valve assembly 104 is overcome and the valve flap 144 rotates about the pivot axis "P" to the open position. The rotational motion of the valve flap 144 is smoothed by a braking action of the mass damper 302.

Figure 3:
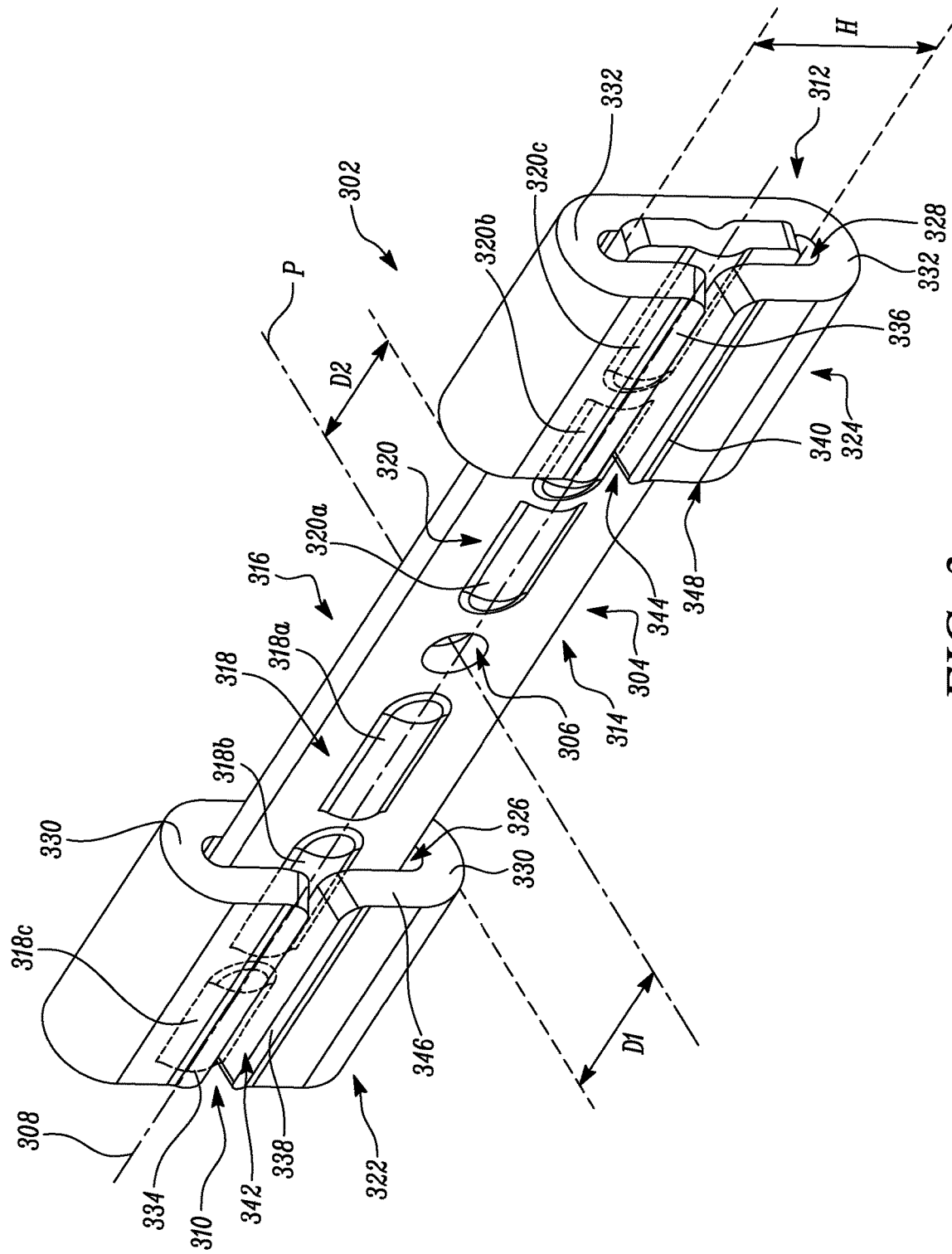
FIG. 3 is a side perspective view of an exemplary mass damper constructed in accordance with the teachings of the subject disclosure.

With reference to FIG. 3, an exemplary mass damper 302 is illustrated. The mass damper 302 has a longitudinal segment 304. The longitudinal segment 304 is coupled to the shaft 108 (shown in FIGS. 1 and 2). More particularly, the longitudinal segment 304 includes a through-bore 306 that receives the first end 106 (shown in FIG. 1) of the shaft 108 for coupling the mass damper 302 to the first end 106 of the shaft 108. The longitudinal segment 304 extends linearly along a centerline axis 308 between a first end 310 and a second end 312 of the longitudinal segment 304. The centerline axis 308 is substantially perpendicular to the pivot axis "P" (shown in FIG. 1). The longitudinal segment 304 includes an inboard side 314 that faces the conduit 102 and an outboard side 316 that faces away from the conduit 102.

Further, the longitudinal segment 304 includes a first guide portion 318. The first guide portion 318 extends from the first end 310 of the longitudinal segment 304. The first guide portion 318 slidably receives at least a part of a first damping mass 322 thereon. In the illustrated embodiment, the first guide portion 318 includes a number of first projections 318a,318b, 318c. The first projections 318a,318b, 318c may allow locking of the first damping masses 322 with the longitudinal segment 304. As shown, the first guide portion 318 includes three projections 318a,318b, 318c. The first projections 318a,318b, 318c are spaced apart from each other along the longitudinal axis 308. In one embodiment, two adjacently disposed first projections 318a,318b, 318c may be separated by a through-hole provided in the longitudinal segment 304. Each of the first projections 318a, 318b, 318c may alternatively include crimps provided on the longitudinal segment 304. In another embodiment, the first guide portion 318 may include a single projection or crimp extending from the first end 310 towards the pivot axis "P".

The longitudinal segment 304 further includes a second guide portion 320. The second guide portion 320 extends from the second end 312 of the longitudinal segment 304. The second guide portion 320 slidably receives at least a part of a second damping mass 324 thereon. In the illustrated embodiment, the second guide portion 320 includes a number of second projections 320a,320b, 320c. The second projections 320a,320b, 320c may allow locking of the second damping masses 324 with the longitudinal segment 304. As shown, the second guide portion 320 includes three projections 320a, 320b, 320c. The second projections 320a, 320b, 320c are spaced apart from each other along the longitudinal axis 308. In one embodiment, two adjacently disposed second projections 320a, 320b, 320c may be separated by a through-hole provided in the longitudinal segment 304. Each of the second projections 320a, 320b, 320c may alternatively include crimps provided on the longitudinal segment 304. In another embodiment, the second guide portion 320 may include a single projection or crimp extending from the second end 312 towards the pivot axis "P".

The first and second guide portions 318, 320 may be provided on any one of the inboard side 314 and the outboard side 316 of the longitudinal segment 304. In the illustrated example, the first and second guide portions 318, 320 are provided on the inboard side 314 of the longitudinal segment 304. Further, the first and second guide portions 318, 320 are centrally located along a height "H" of the longitudinal segment 304. Alternatively, the first and second guide portions 318, 320 may be offset with respect to the centerline axis 308. In another example, each of the first and second guide portions 318, 320 may include a curved section projecting from a lower edge of the longitudinal segment 304. Alternatively, each of the first and second guide portions 318, 320 may include a curved section projecting from an upper edge of the longitudinal segment 304.

The mass damper 302 includes the first damping mass 322 that is disposed proximal to the first end 310 of the longitudinal segment 304. The first damping mass 322 includes a through opening 326 to receive a portion of the longitudinal segment 304. The through opening 326 extends along the centerline axis 308. The first damping mass 322 is movably coupled with the longitudinal segment 304. Further, the first damping mass 322 is linearly movable along the centerline axis 308 to a first distance "D1" with respect to the pivot axis "P". The first damping mass 322 is fixedly coupled to the longitudinal segment 304 at the first distance "D1". In an example, the first distance "D1" may be defined between the pivot axis "P" and a side surface 346 of the first damping mass 322. The first distance "D1" is decided based on damping requirements of the exhaust system, and thus the first distance "D1" may vary based on application requirements without limiting the scope of the present disclosure.

Further, the mass damper 302 includes the second damping mass 324 that is disposed proximal to the second end 312 of the longitudinal segment 304. The second damping mass 324 includes a through opening 328 to receive a portion of the longitudinal segment 304. The through opening 328 extends along the centerline axis 308. The second damping mass 324 is movably coupled with the longitudinal segment 304. Further, the second damping mass 324 is linearly movable along the centerline axis 308 to a second distance "D2" with respect to the pivot axis "P". The second damping mass 324 is fixedly coupled to the longitudinal segment 304 at the second distance "D2". In an example, the second distance "D2" may be defined between the pivot axis "P" and a side surface 348 of the second damping mass 324. The second distance "D2" is decided based on damping requirements of the exhaust system, and thus the second distance "D2" may vary based on application requirements without limiting the scope of the present disclosure. It should be noted that each of the first and second damping masses 322, 324 may be coupled to the longitudinal segment 304 at the respective first and second distances "D1", "D2" using adhesives or any other mechanical coupling techniques, such as, welding, brazing, soldering, and the like, without any limitations.

In the illustrated example, each of the first and second damping masses 322, 324 is clip-shaped. The first damping mass 322 includes a pair of bends 330. Similarly, the second damping mass 324 includes a pair of bends 332. The term "clip-shaped", as used herein, refers to a component that includes a slit or a gap between two opposing ends, thereby making the component discontinuous. The first damping mass 322 defines a first edge portion 334 and a second edge portion 338 facing the first edge portion 334. Similarly, the second damping mass 324 defines a first edge portion 336 and a second edge portion 340 facing the first edge portion 336. The first edge portions 334, 336 of the respective first and second damping masses 322, 324 are separated from the respective second edge portions 338, 340 such that corresponding gaps 342, 344 are formed therebetween. Further, each of the first edge portions 334, 336 includes a curved profile. Similarly, each of the second edge portions 338, 340 includes a curved profile. In an example, interior surfaces defined by the first edge portions 334, 336 may contact the first and second guide portions 318, 320, respectively. Further, interior surfaces defined by the second edge portions 338, 340 may contact the first and second guide portions 318, 320, respectively.

The mass damper 302 may be formed using a variety of different manufacturing processes. By way of example and without limitation, the mass damper 302 may be formed from a stamped blank. The first and second damping masses 322, 324 may be formed by folding or bending a blank piece to provide the respective bends 330, 332 on the first and second damping masses 322, 324. The first and second damping masses 322, 324 may also be formed by molding or casting, or using a metal removal process.

A wide variety of different materials can be used for the mass damper 302. By way of non-limiting example, the mass damper 302 may be made of metal, such as iron, steel, or stainless steel. The material undergoes plastic deformation at the respective bends 330, 332 on the first and second damping masses 322, 324 during the bending manufacturing process such that the respective bends 330, 332 on the first and second damping masses 322, 324 are permanent and do not unfold. By way of non-limiting example, the mass damper 302 may be welded to the first end 106 of the shaft 108. Alternatively, the mass damper 302 may be threaded onto the first end 106 of the shaft 108 or coupled to the first end 106 of the shaft 108 using a fastener (not shown) or an adhesive. Further, the first and second damping masses 322, 324 may be staked or flare fitted with the longitudinal segment 304.

Figure 4:
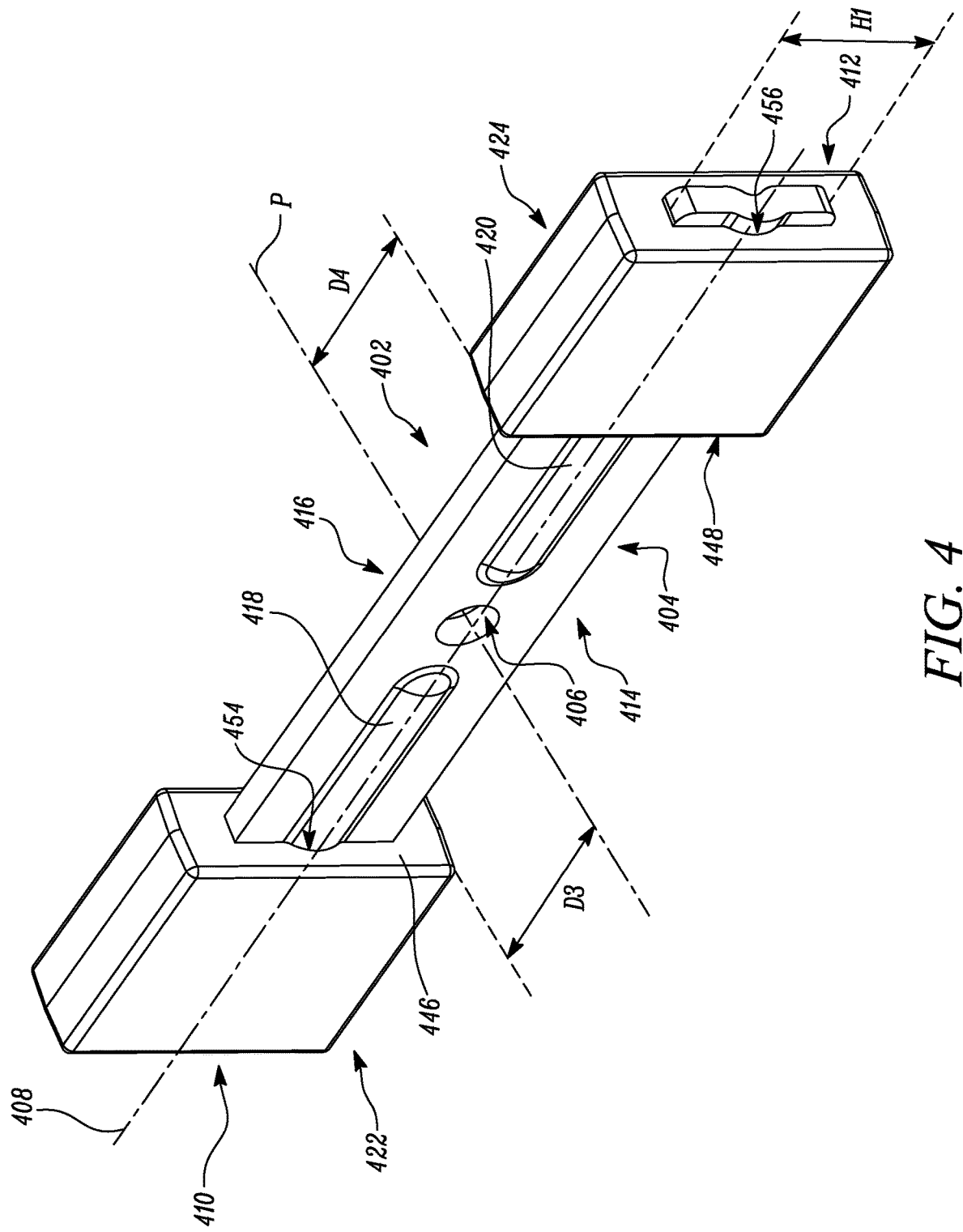
FIG. 4 is a side perspective view of another exemplary mass damper constructed in accordance with the teachings of the subject disclosure.

With reference to FIG. 4, another exemplary mass damper 402 is illustrated. The mass damper 402 has a longitudinal segment 404. The longitudinal segment 404 is coupled to the shaft 108 (shown in FIGS. 1 and 2). More particularly, the longitudinal segment 404 includes a through-bore 406 that receives the first end 106 (shown in FIG. 1) of the shaft 108 for coupling the mass damper 402 to the first end 106 of the shaft 108. The longitudinal segment 404 extends linearly along a centerline axis 408 between a first end 410 and a second end 412 of the longitudinal segment 404. The centerline axis 408 is substantially perpendicular to the pivot axis "P" (shown in FIG. 1). The longitudinal segment 404 includes an inboard side 414 that faces the conduit 102 and an outboard side 416 that faces away from the conduit 102.

Further, the longitudinal segment 404 includes a first guide portion 418. The first guide portion 418 extends from the first end 410 of the longitudinal segment 404. The first guide portion 418 slidably receives at least a part of a first damping mass 422 thereon. The longitudinal segment 404 further includes a second guide portion 420. The second guide portion 420 extends from the second end 412 of the longitudinal segment 404. The second guide portion 420 slidably receives at least a part of a second damping mass 424 thereon. The first and second guide portions 418, 420 may include projections provided on any one of the inboard side 414 and the outboard side 416 of the longitudinal segment 404. The first and second guide portions 418, 420 may alternatively include a crimp provided on the longitudinal segment 404. In the illustrated example, the first and second guide portions 418, 420 are provided on the inboard side 414 of the longitudinal segment 404. Further, the first and second guide portions 418, 420 are centrally located along a height "H1" of the longitudinal segment 404. Alternatively, the first and second guide portions 418, 420 may be offset with respect to the centerline axis 408. In another example, each of the first and second guide portions 418, 420 may include a curved section projecting from a lower edge of the longitudinal segment 404. Alternatively, each of the first and second guide portions 418, 420 may include a curved section projecting from an upper edge of the longitudinal segment 404.

The mass damper 402 includes the first damping mass 422 that is disposed proximal to the first end 410 of the longitudinal segment 404. The first damping mass 422 includes a through opening (not shown) to receive a portion of the longitudinal segment 404. The through opening extends along the centerline axis 408. The first damping mass 422 is movably coupled with the longitudinal segment 404. Further, the first damping mass 422 is linearly movable along the centerline axis 408 to a first distance "D3" with respect to the pivot axis "P". The first damping mass 422 is fixedly coupled to the longitudinal segment 404 at the first distance "D3". In an example, the first distance "D3" may be defined between the pivot axis "P" and a side surface 446 of the first damping mass 422. The first distance "D3" is decided based on damping requirements of the exhaust system, and thus the first distance "D3" may vary based on application requirements without limiting the scope of the present disclosure.

Further, the mass damper 402 includes the second damping mass 424 that is disposed proximal to the second end 412 of the longitudinal segment 404. The second damping mass 424 includes a through opening (not shown) to receive a portion of the longitudinal segment 404. The through opening extends along the centerline axis 408. The second damping mass 424 is movably coupled with the longitudinal segment 404. Further, the second damping mass 424 is linearly movable along the centerline axis 408 to a second distance "D4" with respect to the pivot axis "P". The second damping mass 424 is fixedly coupled to the longitudinal segment 404 at the second distance "D4". In an example, the second distance "D4" may be defined between the pivot axis "P" and a side surface 448 of the second damping mass 424. The second distance "D4" is decided based on damping requirements of the exhaust system, and thus the second distance "D4" may vary based on application requirements without limiting the scope of the present disclosure. It should be noted that the first and second damping masses 422, 424 may be coupled to the longitudinal segment 404 at the respective first and second distances "D3", "D4" using adhesives or any other mechanical coupling techniques, such as, welding, brazing, soldering, and the like, without any limitations.

In the illustrated example, each of the first and second damping masses 422, 424 is rectangular in shape. Further, the first damping mass 422 defines a groove 454 that is part of the through opening of the first damping mass 422. Specifically, the groove 454 is disposed at an end of the through opening of the first damping mass 422. The second damping mass 424 also defines a groove 456 that is part of the through opening of the second damping mass 424. Specifically, the groove 456 is disposed at an end of the through opening of the second damping mass 424. Each of the grooves 454, 456 extends parallel to the centerline axis 408. The groove 454 of the first damping mass 422 is provided so that the first damping mass 422 can receive the first guide portion 418 of the longitudinal segment 404. The grooves 456 of the second damping mass 424 is provided so that the second damping mass 424 can receive the second guide portion 420 of the longitudinal segment 404.

The mass damper 402 may be formed using a variety of different manufacturing processes. By way of example and without limitation, the mass damper 402 may be formed from a stamped blank. The first and second damping masses 422, 424 may be formed by molding or casting, or using a metal removal process. Further, a wide variety of different materials can be used for the mass damper 402. By way of non-limiting example, the mass damper 402 may be made of metal, such as iron, steel, or stainless steel. By way of non-limiting example, the mass damper 402 may be welded to the first end 106 of the shaft 108. Alternatively, the mass damper 402 may be threaded onto the first end 106 of the shaft 108 or coupled to the first end 106 of the shaft 108 using a fastener (not shown) or an adhesive. Further, the first and second damping masses 422, 424 may be staked or flare fitted with the longitudinal segment 404.

Figure 5:
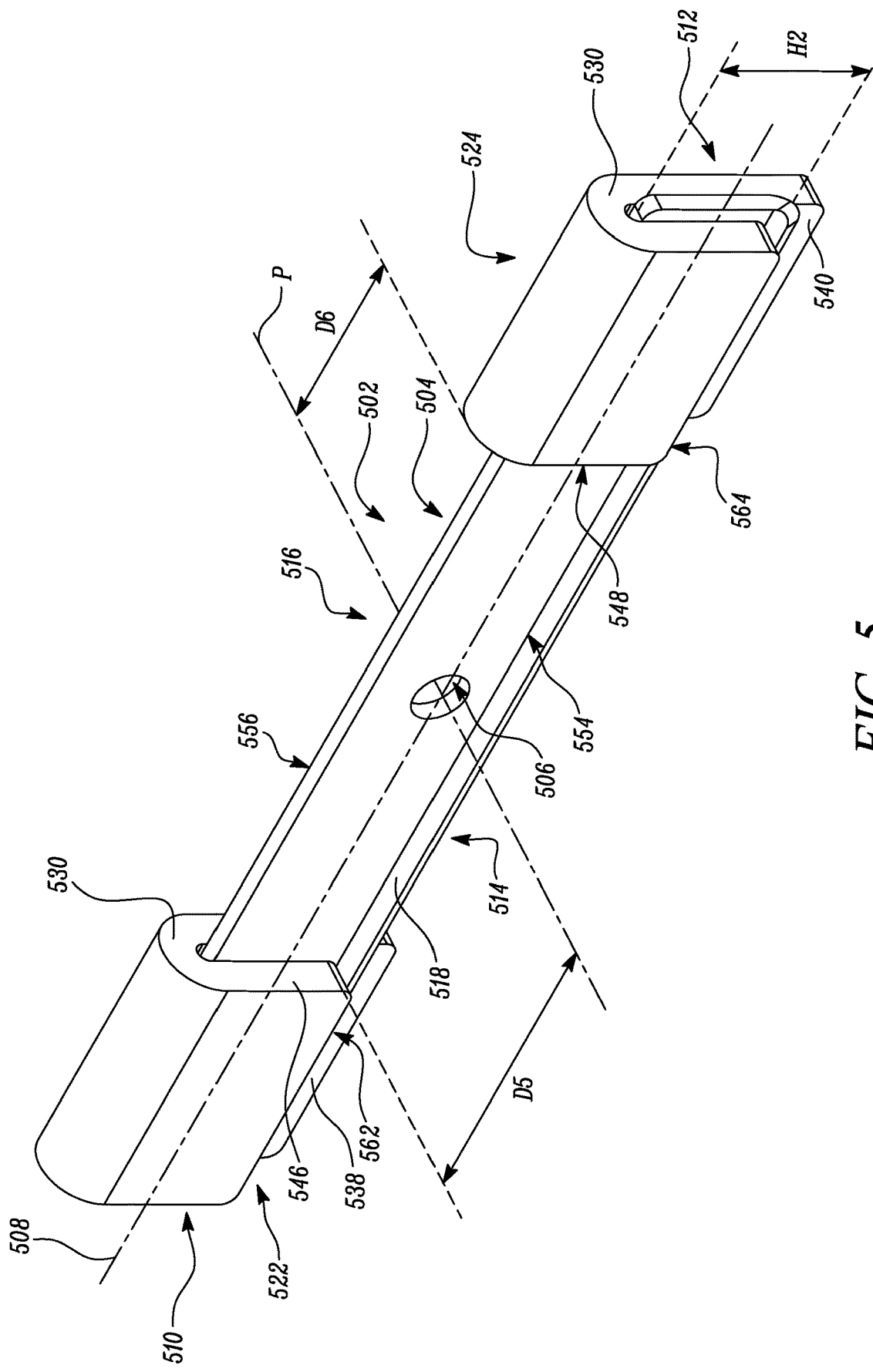
FIG. 5 is a side perspective view of yet another exemplary mass damper constructed in accordance with the teachings of the subject disclosure.

With reference to FIG. 5, an exemplary mass damper 502 is illustrated. The mass damper 502 has a longitudinal segment 504. The longitudinal segment 504 is coupled to the shaft 108 (shown in FIGS. 1 and 2). More particularly, the longitudinal segment 504 includes a through-bore 506 that receives the first end 106 (shown in FIG. 1) of the shaft 108 for coupling the mass damper 502 to the first end 106 of the shaft 108. The longitudinal segment 504 extends linearly along a centerline axis 508 between a first end 510 and a second end 512 of the longitudinal segment 504. The centerline axis 508 is substantially perpendicular to the pivot axis "P" (shown in FIG. 1). The longitudinal segment 504 includes an inboard side 514 that faces the conduit 102 and an outboard side 516 that faces away from the conduit 102.

Further, the longitudinal segment 504 includes a guide portion 518. The guide portion 518 extends from the first end 510 of the longitudinal segment 504 to the second end 512 of the longitudinal segment 504. The guide portion 518 slidably receives at least a part of each of a first damping mass 522 proximate to the first end 510 and a second damping mass 524 proximate to the second end 512. Further, the guide portion 518 may be provided on any one of the inboard side 514 and the outboard side 516 of the longitudinal segment 504. In the illustrated example, the guide portion 518 is provided on the inboard side 514 of the longitudinal segment 504. Further, the guide portion 518 is embodied as a curved section projecting from a lower edge 554 of the longitudinal segment 504. In other examples, the guide portion 518 may be centrally located along a height "H2" of the longitudinal segment 504. Alternatively, the guide portion 518 may include a curved section projecting from an upper edge 556 of the longitudinal segment 504.

The mass damper 502 includes the first damping mass 522 that is disposed proximal to the first end 510 of the longitudinal segment 504. The first damping mass 522 includes a through opening (not shown) to receive a portion of the longitudinal segment 504. The through opening extends along the centerline axis 508. The first damping mass 522 is movably coupled with the longitudinal segment 504. Further, the first damping mass 522 is linearly movable along the centerline axis 508 to a first distance "D5" with respect to the pivot axis "P". The first damping mass 522 is fixedly coupled to the longitudinal segment 504 at the first distance "D5". In an example, the first distance "D5" may be defined between the pivot axis "P" and a side surface 546 of the first damping mass 522. The first distance "D5" is decided based on damping requirements of the exhaust system, and thus the first distance "D5" may vary based on application requirements without limiting the scope of the present disclosure.

Further, the mass damper 502 includes the second damping mass 524 that is disposed proximal to the second end 512 of the longitudinal segment 504. The second damping mass 524 includes a through opening (not shown) to receive a portion of the longitudinal segment 504. The through opening extends along the centerline axis 508. The second damping mass 524 is movably coupled with the longitudinal segment 504. Further, the second damping mass 524 is linearly movable along the centerline axis 508 to a second distance "D6" with respect to the pivot axis "P". The second damping mass 524 is fixedly coupled to the longitudinal segment 504 at the second distance "D6". In an example, the second distance "D6" may be defined between the pivot axis "P" and a side surface 548 of the second damping mass 524. The second distance "D6" is decided based on damping requirements of the exhaust system, and thus the second distance "D6" may vary based on application requirements without limiting the scope of the present disclosure. It should be noted that the first and second damping masses 522, 524 may be coupled to the longitudinal segment 504 at the respective first and second distances "D5", "D6" using adhesives or any other mechanical coupling techniques, such as, welding, brazing, soldering, and the like, without any limitations.

In the illustrated example, each of the first and second damping masses 522, 524 is clip-shaped. The first damping mass 522 includes a pair of bends 530. Similarly, the second damping mass 524 includes a pair of bends 532. The first damping mass 522 defines a first surface 562 and a base portion 538. The base portion 538 extends perpendicularly from a lower edge of the first damping mass 522. The first surface 562 is separated from the base portion 538 such that a gap (not shown) is formed therebetween. The gap between the first surface 562 and the base portion 538 receives a part of the guide portion 518. Further, the first surface 562 rests on an upper side of the guide portion 518 when the first damping mass 522 slides along the longitudinal segment 504. Additionally, the base portion 538 defines a second surface (not shown), such that a lower side of the guide portion 518 contacts the second surface when the first damping mass 522 slides along the longitudinal segment 504. The contact between the base portion 538 and the guide portion 518 at the first side 510 prevents sliding of the first damping mass 522.

Further, the second damping mass 524 defines a first surface 564 and a base portion 540. The base portion 540 extends perpendicularly from a lower edge of the second damping mass 524. The first surface 564 is separated from the base portion 540 such that a gap (not shown) is formed therebetween. The gap between the first surface 564 and the base portion 540 receives a part of the guide portion 518. Further, the first surface 564 rests on the upper side of the guide portion 518 when the second damping mass 524 slides along the longitudinal segment 504. The base portion 540 defines a second surface (not shown), such that the lower side of the guide portion 518 contacts the second surface when the second damping mass 524 slides along the longitudinal segment 504. Further, the contact between the base portion 540 and the guide portion 518 prevents sliding of the second damping masses 524.

The mass damper 502 may be formed using a variety of different manufacturing processes. By way of example and without limitation, the mass damper 502 may be formed from a stamped blank. The first and second damping masses 522, 524 may be formed by folding or bending a blank piece to provide the respective bends 530, 532 and the respective base portions 538, 540 on the first and second damping masses 522, 524. The first and second damping masses 522, 524 may also be formed by molding or casting, or using a metal removal process.

A wide variety of different materials can be used for the mass damper 502. By way of non-limiting example, the mass damper 502 may be made of metal, such as iron, steel, or stainless steel. When the first and second damping masses 522, 524 are manufactured by folding or bending, the material undergoes plastic deformation at the respective bends 530, 532 and the respective base portions 538, 540 on the first and second damping masses 522, 524 during the manufacturing process so that the respective bends 530, 532 and the respective base portions 538, 540 are permanent and do not unfold.

By way of non-limiting example, the mass damper 502 may be welded to the first end 106 of the shaft 108. Alternatively, the mass damper 502 may be threaded onto the first end 106 of the shaft 108 or coupled to the first end 106 of the shaft 108 using a fastener (not shown) or an adhesive. Further, each of the first and second damping masses 522, 524 may be clipped on to the longitudinal segment 504.

Figure 6:
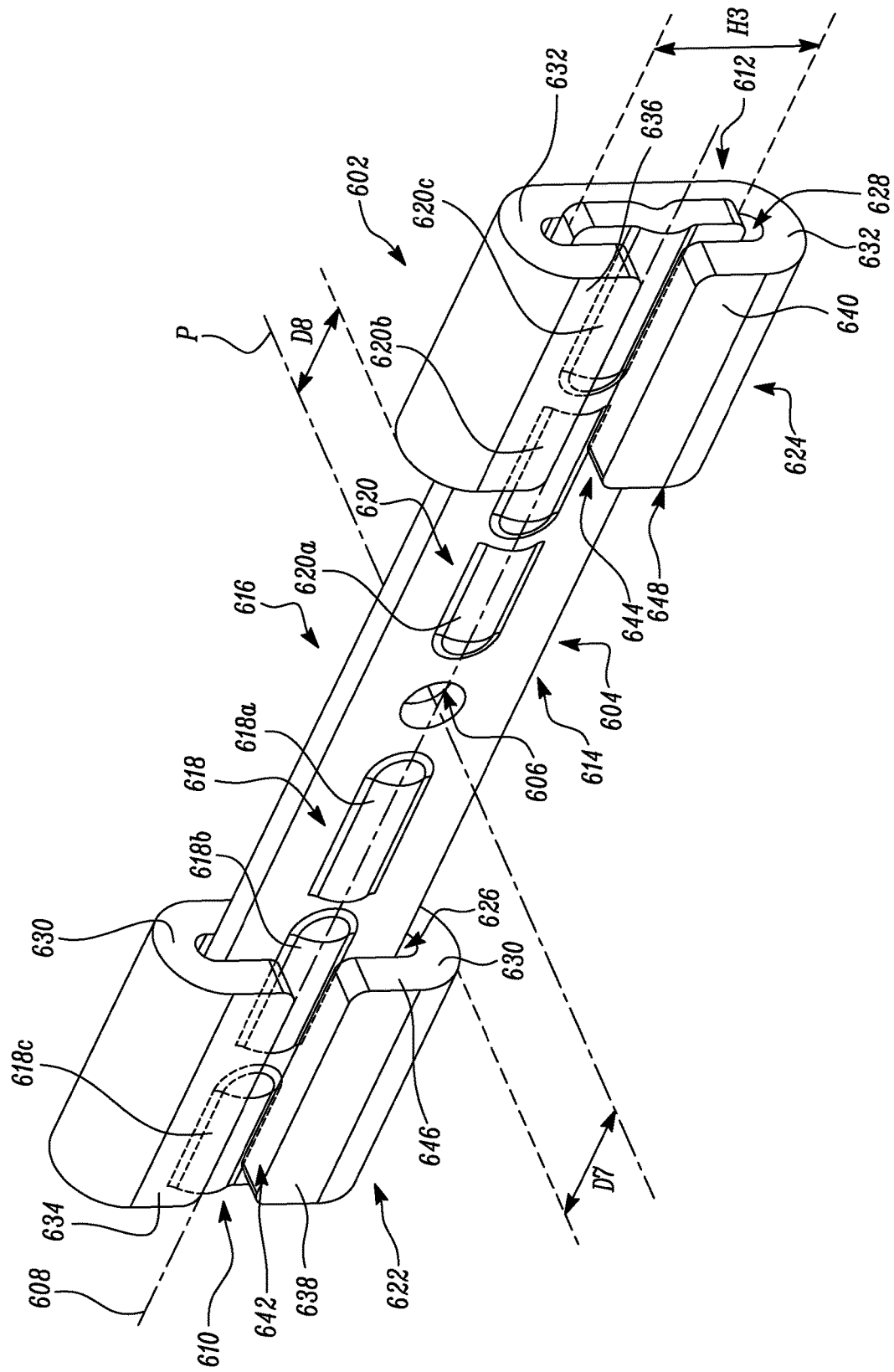
FIG. 6 is a side perspective view of another exemplary mass damper constructed in accordance with the teachings of the subject disclosure.

With reference to FIG. 6, an exemplary mass damper 602 is illustrated. The mass damper 602 has a longitudinal segment 604. The longitudinal segment 604 is coupled to the shaft 108 (shown in FIGS. 1 and 2). More particularly, the longitudinal segment 604 includes a through-bore 606 that receives the first end 106 (shown in FIG. 1) of the shaft 108 for coupling the mass damper 602 to the first end 106 of the shaft 108. The longitudinal segment 604 extends linearly along a centerline axis 608 between a first end 610 and a second end 612 of the longitudinal segment 604. The centerline axis 608 is substantially perpendicular to the pivot axis "P" (shown in FIG. 1). The longitudinal segment 604 includes an inboard side 614 that faces the conduit 102 and an outboard side 616 that faces away from the conduit 102.

Further, the longitudinal segment 604 includes a first guide portion 618. The first guide portion 618 extends from the first end 610 of the longitudinal segment 604. The first guide portion 618 slidably receives at least a part of a first damping mass 622 thereon. In the illustrated embodiment, the first guide portion 618 includes a number of first projections 618a, 618b, 618c. The first projections 618a, 618b, 618c may allow locking of the first damping mass 622 with the longitudinal segment 604. As shown, the first guide portion 618 includes three projections 618a, 618b, 618c. The first projections 618a, 618b, 618c are spaced apart from each other along the longitudinal axis 608. In one embodiment, a space between adjacently disposed first projections 618a, 618b, 618c may be separated by a through-hole provided in the longitudinal segment 604. Each of the first projections 618a, 618b, 618c may alternatively include crimps provided on the longitudinal segment 604. In another embodiment, the first guide portion 618 may include a single projection or crimp extending from the first end 610 towards the pivot axis "P".

The longitudinal segment 604 further includes a second guide portion 620. The second guide portion 620 extends from the second end 612 of the longitudinal segment 604. The second guide portion 620 slidably receives at least a part of a second damping mass 624 thereon. In the illustrated embodiment, the second guide portion 620 includes a number of second projections 620a, 620b, 620c. The second projections 620a, 620b, 620c may allow locking of the second damping mass 624 with the longitudinal segment 604. As shown, the second guide portion 620 includes three projections 620a, 620b, 620c. The second projections 620a, 620b, 620c are spaced apart from each other along the longitudinal axis 608. In one embodiment, a space between adjacently disposed second projections 620a, 620b, 620c may be separated by a through-hole provided in the longitudinal segment 604. Each of the second projections 620a, 620b, 620c may alternatively include crimps provided on the longitudinal segment 604. In another embodiment, the second guide portion 620 may include a single projection or crimp extending from the second end 612 towards the pivot axis "P".

The first and second guide portions 618, 620 may be provided on any one of the inboard side 614 and the outboard side 616 of the longitudinal segment 604. In the illustrated example, the first and second guide portions 618, 620 are provided on the inboard side 614 of the longitudinal segment 604. Further, the first and second guide portions 618, 620 are centrally located along a height "H3" of the longitudinal segment 604. Alternatively, the first and second guide portions 618, 620 may be offset with respect to the centerline axis 608. In another example, each of the first and second guide portions 618, 620 may include a curved section projecting from a lower edge of the longitudinal segment 604. Alternatively, each of the first and second guide portions 618, 620 may include a curved section projecting from an upper edge of the longitudinal segment 604.

The mass damper 602 includes the first damping mass 622 that is disposed proximal to the first end 610 of the longitudinal segment 604. The first damping mass 622 includes a through opening 626 to receive a portion of the longitudinal segment 604. The through opening 626 extends along the centerline axis 608. The first damping mass 622 is movably coupled with the longitudinal segment 604. Further, the first damping mass 622 is linearly movable along the centerline axis 608 to a first distance "D7" with respect to the pivot axis "P". The first damping mass 622 is fixedly coupled to the longitudinal segment 604 at the first distance "D7". In an example, the first distance "D7" may be defined between the pivot axis "P" and a side surface 646 of the first damping mass 622. The first distance "D7" is decided based on damping requirements of the exhaust system, and thus the first distance "D7" may vary based on application requirements without limiting the scope of the present disclosure.

Further, the mass damper 602 includes the second damping mass 624 that is disposed proximal to the second end 612 of the longitudinal segment 604. The second damping mass 624 includes a through opening 628 to receive a portion of the longitudinal segment 604. The through opening 628 extends along the centerline axis 608. The second damping mass 624 is movably coupled with the longitudinal segment 604. Further, the second damping mass 624 is linearly movable along the centerline axis 608 to a second distance "D8" with respect to the pivot axis "P". The second damping mass 624 is fixedly coupled to the longitudinal segment 604 at the second distance "D8". In an example, the second distance "D8" may be defined between the pivot axis "P" and a side surface 648 of the second damping mass 624. The second distance "D8" is decided based on damping requirements of the exhaust system, and thus the second distance "D8" may vary based on application requirements without limiting the scope of the present disclosure. It should be noted that the first and second damping masses 622, 624 may be coupled to the longitudinal segment 604 at the respective first and second distances "D7", "D8" using adhesives or any other mechanical coupling techniques, such as, welding, brazing, soldering, and the like, without any limitations.

In the illustrated example, each of the first and second damping masses 622, 624 is clip-shaped. The first damping mass 622 includes a pair of bends 630. Similarly, the second damping mass 624 includes a pair of bends 632. The first damping mass 622 defines a first edge portion 634 and a second edge portion 638 facing the first edge portion 634. Similarly, the second damping mass 624 defines a first edge portion 636 and a second edge portion 640 facing the first edge portion 636. The first edge portions 634, 636 of the respective first and second damping masses 622, 624 are separated from the respective second edge portions 638, 640 such that corresponding gaps 642, 644 are formed therebetween. In an example, the first edge portions 634, 636 define interior surfaces that may contact the first and second guide portions 618, 620, respectively. Further, interior surfaces defined by the second edge portions 638, 640 may contact the first and second guide portions 618, 620, respectively.

The mass damper 602 may be formed using a variety of different manufacturing processes. By way of example and without limitation, the mass damper 602 may be formed from a stamped blank. The first and second damping masses 622, 624 may be formed by folding or bending a blank piece to provide the respective bends 630, 632 on the first and second damping masses 622, 624. The first and second damping masses 622, 624 may also be formed by molding or casting, or using a metal removal process.

A wide variety of different materials can be used for the mass damper 602. By way of non-limiting example, the mass damper 602 may be made of metal, such as iron, steel, or stainless steel. When the first and second damping masses 622, 624 are manufactured by folding or bending, the material undergoes plastic deformation at the respective bends 630, 632 on the first and second damping masses 622, 624 so that the respective bends 630, 632 on the first and second damping masses 622, 624 are permanent and do not unfold. By way of non-limiting example, the mass damper 602 may be welded to the first end 106 of the shaft 108. Alternatively, the mass damper 602 may be threaded onto the first end 106 of the shaft 108 or coupled to the first end 106 of the shaft 108 using a fastener (not shown) or an adhesive. Further, the first and second damping masses 622, 624 may be staked or flare fitted with the longitudinal segment 604.

Figure 7:
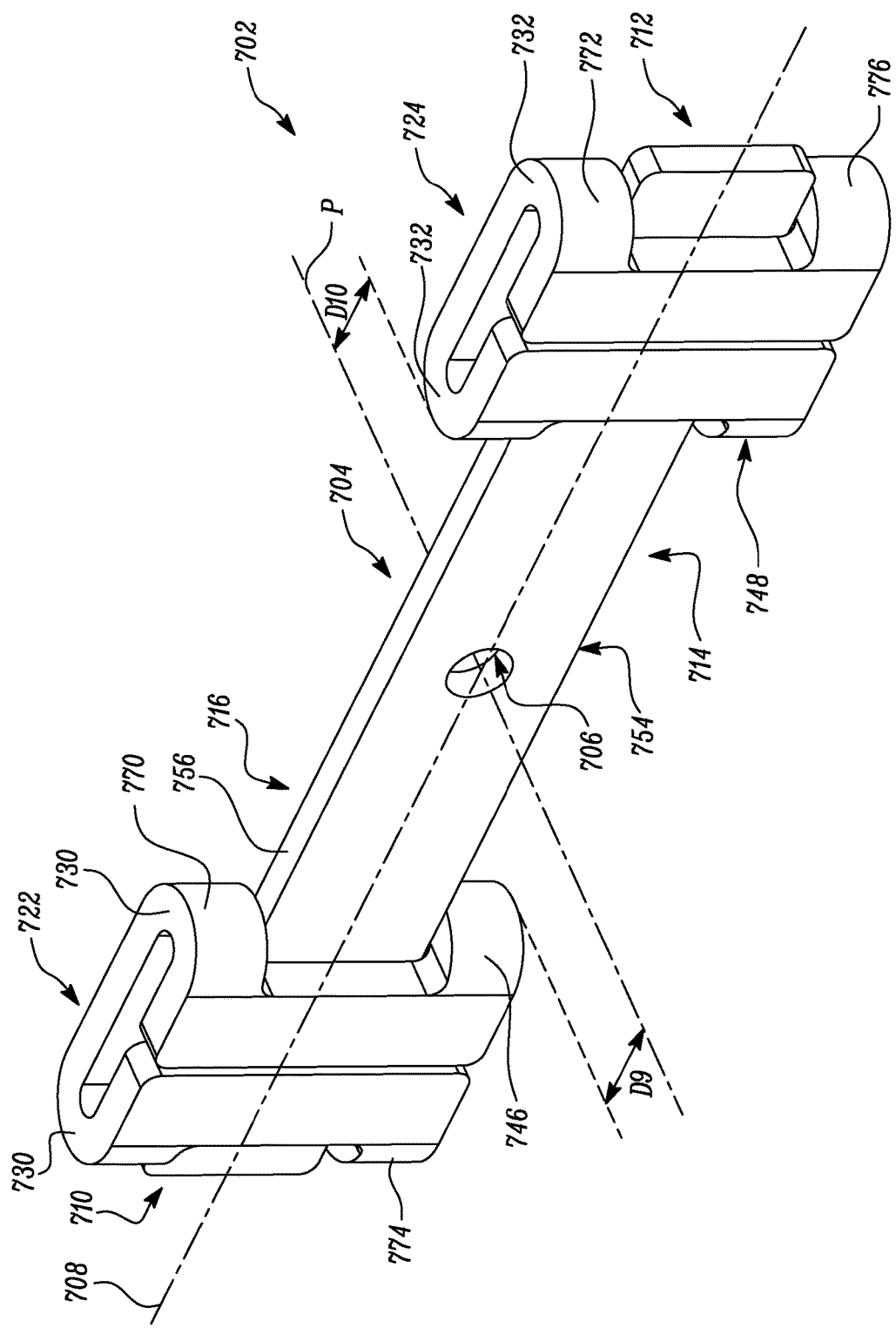
FIG. 7 is a side perspective view of yet another exemplary mass damper constructed in accordance with the teachings of the subject disclosure.

With reference to FIG. 7, an exemplary mass damper 702 is illustrated. The mass damper 702 has a longitudinal segment 704. The longitudinal segment 704 is coupled to the shaft 108 (shown in FIGS. 1 and 2). More particularly, the longitudinal segment 704 includes a through-bore 706 that receives the first end 106 (shown in FIG. 1) of the shaft 108 for coupling the mass damper 702 to the first end 106 of the shaft 108. The longitudinal segment 704 extends linearly along a centerline axis 708 between a first end 710 and a second end 712 of the longitudinal segment 704. The centerline axis 708 is substantially perpendicular to the pivot axis "P" (shown in FIG. 1). The longitudinal segment 704 includes an inboard side 714 that faces the conduit 102 and an outboard side 716 that faces away from the conduit 102.

The mass damper 702 includes a first damping mass 722 that is disposed proximal to the first end 710 of the longitudinal segment 704. The first damping mass 722 includes a through opening (not shown) to receive a portion of the longitudinal segment 704. The through opening extends along the centerline axis 708. The first damping mass 722 is movably coupled with the longitudinal segment 704. Further, the first damping mass 722 is linearly movable along the centerline axis 708 to a first distance "D9" with respect to the pivot axis "P". The first damping mass 722 is fixedly coupled to the longitudinal segment 704 at the first distance "D9". In an example, the first distance "D9" may be defined between the pivot axis "P" and a side surface 746 of the first damping mass 722. The first distance "D9" is decided based on damping requirements of the exhaust system, and thus the first distance "D9" may vary based on application requirements without limiting the scope of the present disclosure.

The mass damper 702 further includes a second damping mass 724 that is disposed proximal to the second end 712 of the longitudinal segment 704. The second damping mass 724 includes a through opening (not shown) to receive a portion of the longitudinal segment 704. The through opening extends along the centerline axis 708. The second damping mass 724 is movably coupled with the longitudinal segment 704. Further, the second damping mass 724 is linearly movable along the centerline axis 708 to a second distance "D10" with respect to the pivot axis "P". The second damping mass 724 is fixedly coupled to the longitudinal segment 704 at the second distance "D10". In an example, the second distance "D10" may be defined between the pivot axis "P" and a side surface 748 of the second damping mass 724. The second distance "D10" is decided based on damping requirements of the exhaust system, and thus the second distance "D10" may vary based on application requirements without limiting the scope of the present disclosure. It should be noted that the first and second damping masses 722, 724 may be coupled to the longitudinal segment 704 at the respective first and second distances "D9", "D10" using adhesives or any other mechanical coupling techniques, such as, welding, brazing, soldering, and the like, without any limitations.

A design of the first and second damping masses 722, 724 will now be explained. In the illustrated example, each of the first and second damping masses 722, 724 is clip-shaped. The first damping mass 722 includes a pair of bends 730. Similarly, the second damping mass 724 includes a pair of bends 732. Further, the first damping mass 722 includes an upper receiving portion 770 and a lower receiving portion 774 that is spaced apart from the upper receiving portion 770. The upper receiving portion 770 is disposed on an upper edge 756 of the longitudinal segment 704 and the lower receiving portion 774 is disposed on a lower edge 754 of the longitudinal segment 704. The upper receiving portion 770 and the lower receiving portion 774 at least partially receive the longitudinal segment 704 therebetween. More particularly, the upper receiving portion 770 and the lower receiving portion 774 at least partly define the through opening that at least partially receives the longitudinal segment 704.

Similarly, the second damping mass 724 includes an upper receiving portion 772 and a lower receiving portion 776 that is spaced apart from the upper receiving portion 772. The upper receiving portion 772 is disposed on the upper edge 756 of the longitudinal segment 704 and the lower receiving portion 776 is disposed on the lower edge 754 of the longitudinal segment 704. The upper receiving portion 772 and the lower receiving portion 776 at least partially receive the longitudinal segment 704 therebetween. More particularly, the upper receiving portion 772 and the lower receiving portion 776 at least partly define the through opening that at least partially receives the longitudinal segment 704.

The mass damper 702 may be formed using a variety of different manufacturing processes. By way of example and without limitation, the mass damper 702 may be formed from a stamped blank. The first and second damping masses 722, 724 may be formed by folding or bending a blank piece to provide the respective bends 730, 732 on the first and second damping masses 722, 724. The first and second damping masses 722, 724 may also be formed by molding or casting, or using a metal removal process.

A wide variety of different materials can be used for the mass damper 702. By way of non-limiting example, the mass damper 702 may be made of metal, such as iron, steel, or stainless steel. When the first and second damping masses 722, 724 are manufactured by folding or bending, the material undergoes plastic deformation at the respective bends on the first and second damping masses 722, 724 during the manufacturing process so that the respective bends 730, 732 on the first and second damping masses 722, 724 are permanent and do not unfold. By way of non-limiting example, the mass damper 702 may be welded to the first end 106 of the shaft 108. Alternatively, the mass damper 702 may be threaded onto the first end 106 of the shaft 108 or coupled to the first end 106 of the shaft 108 using a fastener (not shown) or an adhesive. Further, the first and second damping masses 722, 724 may be staked or flare fitted with the longitudinal segment 704.

Figure 8:
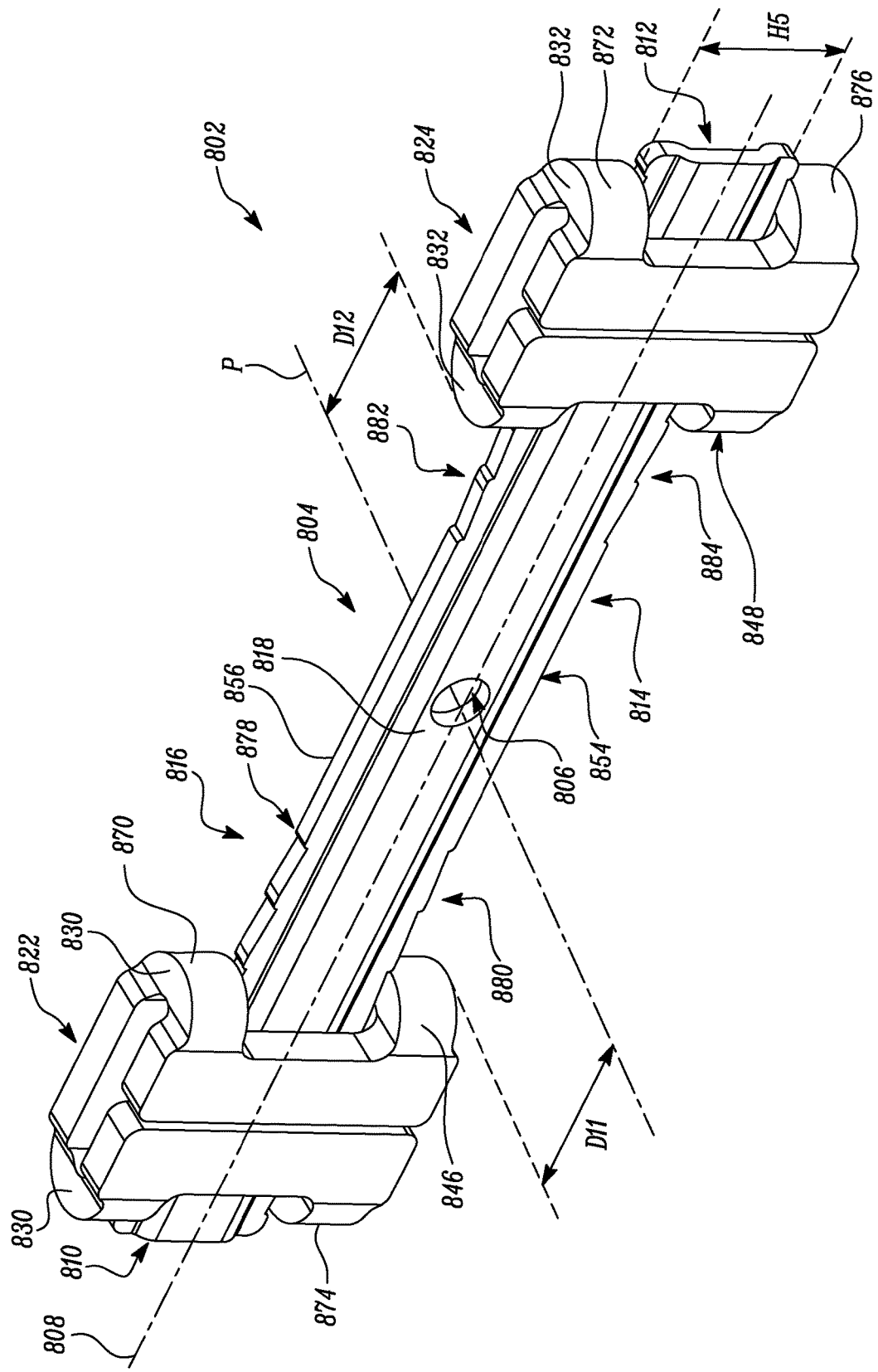
FIG. 8 is a side perspective view of another exemplary mass damper constructed in accordance with the teachings of the subject disclosure.

With reference to FIG. 8, an exemplary mass damper 802 is illustrated. The mass damper 802 has a longitudinal segment 804. The longitudinal segment 804 is coupled to the shaft 108 (shown in FIGS. 1 and 2). More particularly, the longitudinal segment 804 includes a through-bore 806 that receives the first end 106 (shown in FIG. 1) of the shaft 108 for coupling the mass damper 802 to the first end 106 of the shaft 108. The longitudinal segment 804 extends linearly along a centerline axis 808 between a first end 810 and a second end 812 of the longitudinal segment 804. The centerline axis 808 is substantially perpendicular to the pivot axis "P" (shown in FIG. 1). The longitudinal segment 804 includes an inboard side 814 that faces the conduit 102 and an outboard side 816 that faces away from the conduit 102.

Further, the longitudinal segment 804 includes a guide portion 818. The guide portion 818 extends from the first end 810 of the longitudinal segment 804 to the second end 812 of the longitudinal segment 804. The guide portion 818 slidably receives at least a part of each of a first damping mass 822 proximate to the first end 810 and a second damping mass 824 proximate to the second end 812. The guide portion 818 may include a projection provided on any one of the inboard side 814 and the outboard side 816 of the longitudinal segment 804. In the illustrated example, the guide portion 818 is provided on the inboard side 814 of the longitudinal segment 804. Further, the guide portion 818 is centrally located along a height "H5" of the longitudinal segment 804. In other examples, the guide portion 818 may include a curved section projecting from a lower edge 854 of the longitudinal segment 804. In yet another example, the guide portion 818 may include a curved section projecting from an upper edge 856 of the longitudinal segment 804.

Further, the longitudinal segment 804 includes a plurality of first locking portions 878, 882 disposed on the upper edge 856 of the longitudinal segment 804. The first locking portion 878 is disposed proximal to the first end 810 and the first locking portion 882 is disposed proximal to the second end 812. The first locking portion 878 is spaced apart from the first locking portion 882 along the centerline axis 808 of the longitudinal segment 804. The longitudinal segment 804 also includes a plurality of second locking portions 880, 884 disposed on the lower edge 854 of the longitudinal segment 804. The second locking portion 880 is disposed proximal to the first end 810 and the second locking portion 884 is disposed proximal to the second end 812. Further, the second locking portion 880 is spaced apart from the second locking portion 884 along the centerline axis 808 of the longitudinal segment 804.

In other examples, the locking portions 878, 880, 882, 884 may be provided on any one of the upper edge 856 and the lower edge 854. The first and second locking portions 878, 880 on the respective upper and lower edges 856, 854 retain the first damping mass 822 at a first distance "D11". Further, the first and second locking portions 882, 884 on the respective upper and lower edges 856, 854 retain the second damping mass 824 at a second distance "D12". Each of the locking portions 878, 880, 882, 884 may include multiple serrations or teeth so that each of the first and second damping masses 822, 824 can engage with the longitudinal segment 804.

The mass damper 802 includes the first damping mass 822 that is disposed proximal to the first end 810 of the longitudinal segment 804. The first damping mass 822 includes a through opening (not shown) to receive a portion of the longitudinal segment 804. The through opening extends along the centerline axis 808. The first damping mass 822 is movably coupled with the longitudinal segment 804. The first damping mass 822 is movable along the first guide portion 818. Further, the first damping mass 822 is linearly movable along the centerline axis 808 to the first distance "D11" with respect to the pivot axis "P". The first damping mass 822 is fixedly coupled to the longitudinal segment 804 at the first distance "D11". In an example, the first distance "D11" may be defined between the pivot axis "P" and a side surface 846 of the first damping mass 822. The first distance "D11" is decided based on damping requirements of the exhaust system, and thus the first distance "D11" may vary based on application requirements without limiting the scope of the present disclosure.

Further, the mass damper 802 includes the second damping mass 824 that is disposed proximal to the second end 812 of the longitudinal segment 804. The second damping mass 824 includes a through opening (not shown) to receive a portion of the longitudinal segment 804. The through opening extends along the centerline axis 808. The second damping mass 824 is movably coupled with the longitudinal segment 804. The second damping mass 824 is movable along the guide portion 818. Further, the second damping mass 824 is linearly movable along the centerline axis 808 to the second distance "D12" with respect to the pivot axis "P". The second damping mass 824 is fixedly coupled to the longitudinal segment 804 at the second distance "D12". In an example, the second distance "D12" may be defined between the pivot axis "P" and a side surface 848 of the second damping mass 824. The second distance "D12" is decided based on damping requirements of the exhaust system, and thus the second distance "D12" may vary based on application requirements without limiting the scope of the present disclosure. It should be noted that the first and second damping masses 822, 824 may be coupled to the longitudinal segment 804 at the respective first and second distances "D11", "D12" using adhesives or any other mechanical coupling techniques, such as, welding, brazing, soldering, and the like, without any limitations.

A design of the first and second damping masses 822, 824 will now be explained. In the illustrated example, each of the first and second damping masses 822, 824 is clip-shaped. The first damping mass 822 includes a pair of bends 830. Similarly, the second damping mass 824 includes a pair of bends 832. Further, the first damping mass 822 includes an upper receiving portion 870 and a lower receiving portion 874 that is spaced apart from the upper receiving portion 870. The upper receiving portion 870 is disposed on the upper edge 856 of the longitudinal segment 804 and the lower receiving portion 874 is disposed on the lower edge 854 of the longitudinal segment 804. The upper receiving portion 870 and the lower receiving portion 874 at least partially receive the longitudinal segment 804 therebetween. More particularly, the upper receiving portion 870 and the lower receiving portion 874 at least partly define the through opening that at least partially receives the longitudinal segment 804.

Similarly, the second damping mass 824 includes an upper receiving portion 872 and a lower receiving portion 876 that is spaced apart from the upper receiving portion 872. The upper receiving portion 872 is disposed on the upper edge 856 of the longitudinal segment 804 and the lower receiving portion 876 is disposed on the lower edge 854 of the longitudinal segment 804. The upper receiving portion 872 and the lower receiving portion 876 at least partially receive the longitudinal segment 804 therebetween. More particularly, the upper receiving portion 872 and the lower receiving portion 876 at least partly define the through opening that at least partially receives the longitudinal segment 804.

Further, each of the upper receiving portions 870, 872 and the lower receiving portions 874, 876 defines inner surfaces (not shown). Each of the inner surfaces may include multiple serrations or teeth so that the respective first and second damping masses 822, 824 can engage with the longitudinal segment 804. The first and second locking portions 878, 880 engage with the respective inner surfaces of the upper and lower receiving portions 870, 874 of the first damping mass 822 to couple the first damping mass 822 with the longitudinal segment 804 at the first distance "D11". More particularly, the upper and lower receiving portions 870, 874 are pressed towards the respective first and second locking portions 878, 880 to lock the first damping mass 822 with the longitudinal segment 804. Further, the first and second locking portions 882, 884 engage with the respective inner surfaces of the upper and lower receiving portions 872, 876 of the second damping mass 824 to couple the second damping mass 824 with the longitudinal segment 804 at the second distance "D12". More particularly, the upper and lower receiving portions 872, 876 are pressed towards the respective first and second locking portions 882, 884 to lock the second damping mass 824 with the longitudinal segment 804.

The mass damper 802 may be formed using a variety of different manufacturing processes. By way of example and without limitation, the mass damper 802 may be formed from a stamped blank. The first and second damping masses 822, 824 may be formed by folding or bending a blank piece to provide the respective bends 830, 832 on the first and second damping masses 822, 824. The first and second damping masses 822, 824 may also be formed by molding or casting, or using a metal removal process.

A wide variety of different materials can be used for the mass damper 802. By way of non-limiting example, the mass damper 802 may be made of metal, such as iron, steel, or stainless steel. When the first and second damping masses 822, 824 are manufactured by folding or bending, the material undergoes plastic deformation at the respective bends 830, 832 during the manufacturing process so that the respective bends 830, 832 are permanent and do not unfold. By way of non-limiting example, the mass damper 802 may be welded to the first end 106 of the shaft 108. Alternatively, the mass damper 802 may be threaded onto the first end 106 of the shaft 108 or coupled to the first end 106 of the shaft 108 using a fastener (not shown) or an adhesive. Further, the first and second damping masses 822, 824 may be staked or flare fitted with the longitudinal segment 804.

The mass dampers 302, 402, 502, 602, 702, 802 described above with reference to FIGS. 3-8 provide a simple mass damper that is coupled to the shaft 108 for damping vibrations present in the valve assembly 104. More particularly, the mass dampers 302, 402, 502, 602, 702, 802 of the valve assembly 104 disclosed herein provides improved dampening of vibration related harmonics and valve flutter caused by flowrate fluctuations in the engine's exhaust flow (i.e. exhaust pulsation). Further, the various examples of mass dampers 302, 402, 502, 602, 702, 802 disclosed add braking mass to the valve flap 144 to reduce the amplitude of the resonant vibration of the valve flap 144 and the biasing member 112.

As the mass dampers 302, 402, 502, 602, 702, 802 described herein are tunable mass dampers, their damping characteristics may be adjusted based on the damping requirements of the exhaust system. More particularly, the first distances "D1", "D3", "D5", "D7", "D9", "D11" and the second distances "D2", "D4", "D6", "D8", "D10", "D12" may be adjusted to vary the damping characteristics of the exhaust system. The mass dampers 302, 402, 502, 602, 702, 802 have a compact structure, and thus they can be mounted within the middle chamber 134. In addition, the mass dampers 302, 402, 502, 602, 702, 802 disclosed herein have improved aesthetics and are cheaper to manufacture than existing designs.

The foregoing description of the embodiments has been provided for purposes of illustration and description. It is not intended to be exhaustive or to limit the subject disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the subject disclosure, and all such modifications are intended to be included within the scope of the subject disclosure.

What is claimed is:

1. A valve assembly for an exhaust system, the valve assembly comprising:
    a conduit defining an exhaust passageway therein;
    a valve flap disposed within the exhaust passageway for controlling exhaust flow through the exhaust passageway;
    a shaft supporting the valve flap in the exhaust passageway for rotation about a pivot axis; and
    a mass damper disposed external to the conduit and coupled to the shaft such that the mass damper rotates with the shaft about the pivot axis, the mass damper including:
        a longitudinal segment coupled to the shaft, the longitudinal segment further extending between a first end and a second end along a centerline axis;
        a first damping mass disposed proximal to the first end of the longitudinal segment, wherein the first damping mass is linearly movable along the centerline axis to a first distance with respect to the pivot axis, wherein the first damping mass is further fixedly coupled to the longitudinal segment at the first distance; and
        a second damping mass disposed proximal to the second end of the longitudinal segment, wherein the second damping mass is linearly movable along the centerline axis to a second distance with respect to the pivot axis, wherein the second damping mass is further fixedly coupled to the longitudinal segment at the second distance.

2. The valve assembly of claim 1, wherein the longitudinal segment further includes:
    a first guide portion extending from the first end of the longitudinal segment, the first guide portion adapted to slidably receive at least a part of the first damping mass thereon; and
    a second guide portion extending from the second end of the longitudinal segment and spaced apart from the first guide portion, the second guide portion adapted to slidably receive at least a part of the second damping mass thereon.

3. The valve assembly of claim 1, wherein the longitudinal segment further includes a guide portion extending from the first end to the second end, wherein the guide portion slidably receives at least a part of each of the first damping mass and the second damping mass thereon.

4. The valve assembly of claim 1, wherein the longitudinal segment further includes:
    a plurality of locking portions disposed on at least one of an upper edge and a lower edge of the longitudinal segment, the plurality of locking portions further spaced apart from each other along the centerline axis of the longitudinal segment, wherein one locking portion of the plurality of locking portions is adapted to retain the first damping mass at the first distance, and wherein another locking portion of the plurality of locking portions is adapted to retain the second damping mass at the second distance.

5. The valve assembly of claim 1, wherein at least one of the first damping mass and the second damping mass is clip-shaped.

6. The valve assembly of claim 1, wherein at least one of the first damping mass and the second damping mass further defines a through opening for at least partially receiving the longitudinal segment therethrough.

7. The valve assembly of claim 1, wherein at least one of the first damping mass and the second damping mass further includes:
    an upper receiving portion disposed on an upper edge of the longitudinal segment; and
    a lower receiving portion spaced apart from the upper receiving portion and disposed on a lower edge of the longitudinal segment, wherein the upper receiving portion and the lower receiving portion at least partially receive the longitudinal segment therebetween.

* * * * *